UNITED STATES PATENT OFFICE.

EMIL ELSAESSER, OF BARMEN, GERMANY, ASSIGNOR TO DAHL & CO., OF SAME PLACE.

BLUE-BLACK DYE AND PROCESS OF MAKING SAME.

SPECIFICATION forming part of Letters Patent No. 611,112, dated September 20, 1898.

Application filed December 31, 1897. Serial No. 665,070. (No specimens.)

*To all whom it may concern:*

Be it known that I, EMIL ELSAESSER, a subject of the King of Würtemberg, residing in Barmen, Germany, have invented certain new and useful Improvements in the Process of Making a New Blue-Black Cotton Dyestuff, of which the following is a specification.

This invention relates to a process of making a new blue-black cotton dyestuff.

I have observed that those binitronaphthalene monosulfonic acids which contain the nitric and sulfonic groups in the positions $NO_2 NO_2 SO_3H$, $alpha_1 alpha_4 alpha_2$ are transformed by the action of sulfid of sodium into a dyestuff which in an alkaline bath dyes unmordanted cotton dark blue to blue black. Those binitronaphthalene sulfonic acids which contain the sulfuric group in another position give only brown to brown-violet dyes which have only a slight affinity to the fibers.

The process of making such a dyestuff is as follows: Thirty kilograms of binitronaphthalene sulfonic acid are dissolved in about one hundred and fifty liters of water, cooled to 20° centigrade, and entered into an equally-cold solution of one hundred and forty kilograms of sulfid of sodium ($Na_2S-5H_2O$) in three hundred liters of water. The reaction develops heat, and care must be taken by timely addition of ice to prevent the temperature from rising above 40° centigrade. A dark-blue solution is formed, whereupon the formation of the dyestuff is finished. The dyestuff solution is now acidified by means of dilute sulfuric acid or hydrochloric acid, whereby the dyestuff mixed with sulfur is precipitated. It is filtered off, washed with a little water, and then dissolved in about two hundred liters of hot water, with the addition of five to ten kilograms of soda, and the dyestuff solution is separated from the undissolved remaining sulfur by filtration. The purified dyestuff is then precipitated with salt.

The dry dyestuff forms a dark powder readily soluble in water, the solution having a blue-black color. It is dissolved in concentrated sulfuric acid with a brown-black color which on diluting with water passes to brown, whereby a brown precipitate is separated off.

Unmordanted cotton is dyed by the dyestuff in an alkaline bath dark blue to blue black. If the dyed material is afterward treated with bichromate or with copper vitriol, a deep black shade is obtained of great fastness to washing and light.

I claim as my invention and desire to secure by Letters Patent—

1. The process of making a direct-dyeing blue-black cotton dyestuff consisting in allowing sulfid of sodium to act upon $alpha_1$ $alpha_4$ dinitronaphthalene $alpha_2$ monosulfonic acid.

2. A blue-black dyestuff in the form of a dark powder derived from a combination of $alpha_1$ $alpha_4$ dinitronaphthalene $alpha_2$ monosulfonic acid with sulfid of sodium, the said dyestuff dyeing unmordanted cotton in an alkaline bath dark blue to blue black being readily soluble in water with a blue-black color and dissolving in concentrated sulfuric acid with a brown-black color which on diluting with water passes to brown, whereby a brown precipitate is separated off.

In testimony whereof I have signed my name to this specification in the presence of two subscribing witnesses.

EMIL ELSAESSER.

Witnesses:
 R. E. JAHN,
 OTTO KÖNIG.